N. THOMAS.
Truck for Moving Railway-Axles, &c.
No. 206,152.  Patented July 16, 1878.
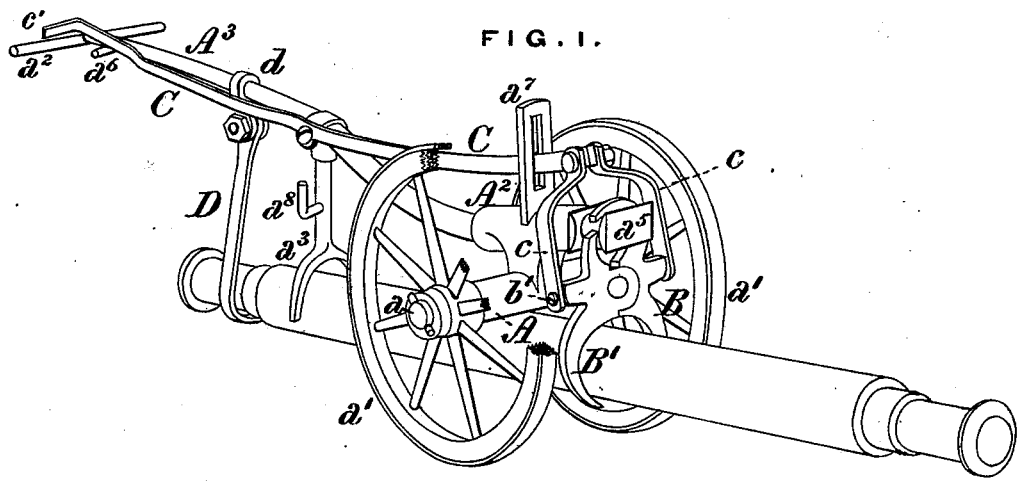
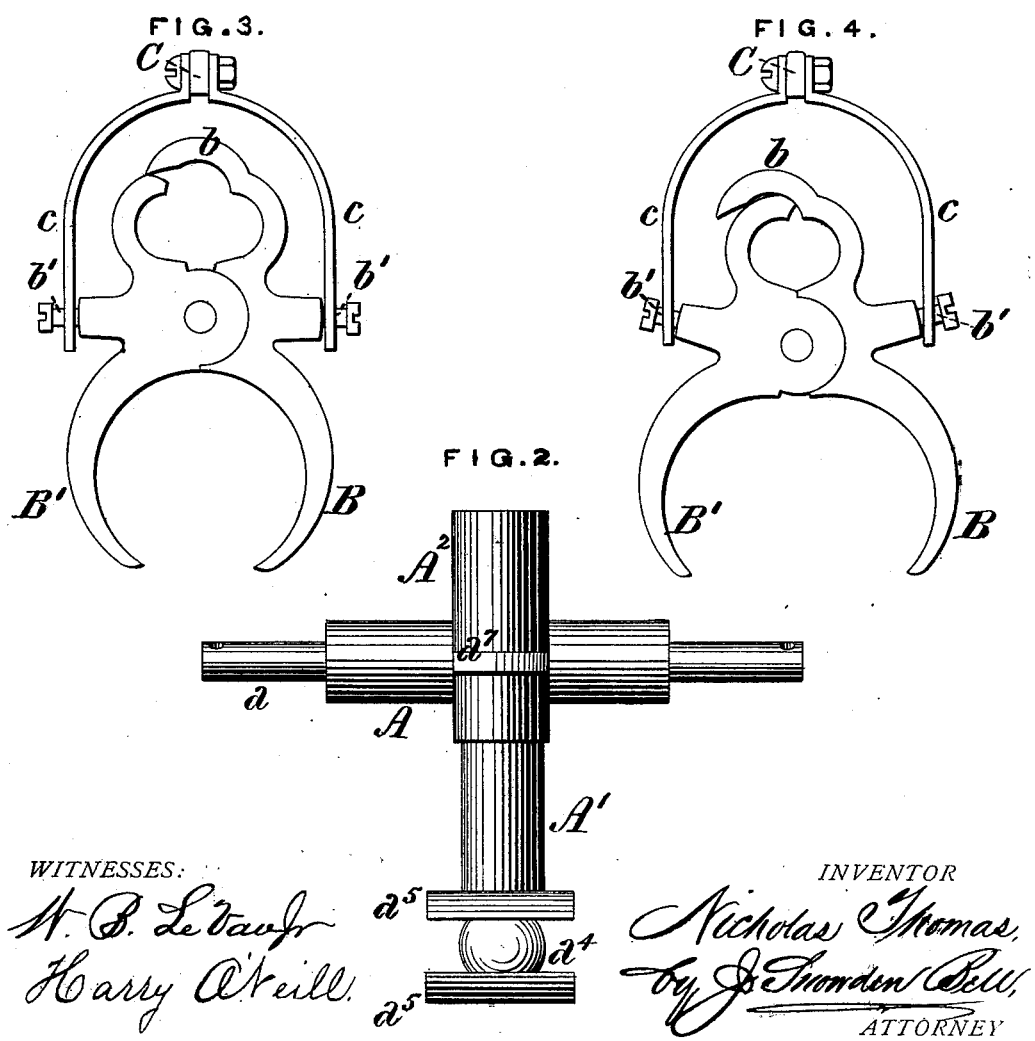

UNITED STATES PATENT OFFICE.

NICHOLAS THOMAS, OF CHICAGO, ILLINOIS.

IMPROVEMENT IN TRUCKS FOR MOVING RAILWAY-AXLES, &c.

Specification forming part of Letters Patent No. 206,152, dated July 16, 1878; application filed April 30, 1878.

*To all whom it may concern:*

Be it known that I, NICHOLAS THOMAS, of Chicago, in the county of Cook and State of Illinois, have invented certain new and useful Improvements in Trucks for Moving Railroad-Axles and other heavy bodies, of which improvements the following is a specification.

The object of my invention is to provide a simple and effective device for picking up and carrying from place to place railroad-axles or other heavy forgings or castings, so that the same may be conveniently and speedily transported to and from a lathe or other machine-tool in which work is to be done upon them, or otherwise moved about a shop or yard, as may be required.

To this end my improvements consist in the combination, with a supporting-axle and pair of wheels, of a sleeve inclosing said axle, or, if preferred, formed in one piece therewith, and having, transversely to its center line, a tongue and a suspending-arm, projecting respectively from the sleeves on opposite sides of the supporting-axle; a pair of claws or nippers hung upon the end of the suspending-arm, and pivoted one to the other below their point of suspension; a lever pivoted to the tongue, for opening and closing the claws, and a bearing or support depending from the tongue, all as hereinafter more fully set forth.

In the accompanying drawings, Figure 1 is a view, in perspective, of a truck embodying my improvement; Fig. 2, a plan or top view of the piece to which the tongue and axle are connected; and Figs. 3 and 4, end views, respectively showing the claws closed and opened.

To carry out my invention, I provide a sleeve or cylindrical body, A, to receive an axle, $a$, upon which the two supporting-wheels $a^1 a^1$ of the truck are mounted so as to rotate freely; or, if deemed preferable, a separate axle may be dispensed with, and the wheels be mounted on journals formed on the body A. An arm, $A^1$, projects from the center of the sleeve A at right angles thereto, and is extended outward from the opposite side thereof to form a socket, $A^2$, in which is inserted and secured the tongue or handle $A^3$ of the truck, which is, by preference, tubular, so as to combine strength and lightness, and has a transverse hand-piece, $a^2$, at its outer end, and a foot or stand, $a^3$, which is recessed or U-shaped at bottom, at or near the middle of its length. A bearing, $a^4$, having a transverse guard, $a^5$, at each side, is formed upon the outer end of the arm $A^1$, and upon this bearing is suspended, by a hook, $b$, formed upon its upper end, a claw or nipper, B, the lower end of which is inwardly curved or hooked, substantially as shown in the drawings, so as to be inserted beneath the axle or other piece to be moved. A claw, $B'$, having a similarly curved or hooked lower end, is pivoted to the claw B below the bearing $a^4$, and a pin, $b'$, is formed upon each of the claws, at right angles to the pivot by which they are connected. A lever, C, is pivoted to the tongue $A^3$ about midway between the axle and the outer end of the tongue, and is connected by pivoted links or straps $c$ with the pins $b'$ of the claws B B'. A handle, $c'$, is formed upon the outer end of the lever C, and a stop, $a^6$, on the tongue serves to support the outer end of the lever when elevated. A vertical guide, $a^7$, on the top of the arm $A^1$ prevents undue lateral movement of the lever. A swinging hook, D, is pivoted to a ring, $d$, which slides on the tongue $A^3$, near its outer end, the function of said hook being, under certain conditions, to assist in supporting the piece to be carried, as presently to be described, and when not in use its free end is supported in a hook or rest, $a^8$, on the stand $a^3$.

In the truck, as thus constituted, the relation of the lever, connecting-links, and claws to the tongue and supporting-arm is such that when subject to the action of gravity the end of the lever to which the claws are attached is depressed, the claws are supported on the bearing of the arm $A^1$, and the lower end of the claws are drawn together, so as to embrace and support an axle inserted between them. When, however, the claw end of the lever is raised, by depressing the opposite end the links draw upon the side pins of the claws and separate the lower ends of the claws, so as to enable them, when the outer end of their supporting-arm is tilted or inclined downward, to pass by the axle to be moved, and to close upon it when the lever is released.

In operation, the truck being brought into position with its tongue above and in line with the axle or other piece to be moved, the handle of the lever is pressed downward, and the claws are raised up and opened into the position shown in Fig. 4. The tongue is then tilted upward, and the claws, still remaining open, are thereby depressed until they pass on each side of the axle to be moved, when the lever is released, and the weight of the claws closes them into the position shown in Figs. 1 and 3, in which position they will embrace and support the axle. If the axle is grasped at such a point in its length as that the preponderance of its weight will be on the side of the claws farthest from the operator, the portion on the opposite side of the claws will be lifted first when the tongue is depressed, and raised until it bears against the recess or U in the bottom of the stand $a^3$, in which position the axle will be securely supported clear of the ground, and may be readily transported as required. If, on the other hand, the preponderance of weight should be nearest the operator, that portion of the axle is supported by slipping the swinging hook D beneath it and raising the tongue until the axle is, as before, clear of the ground.

I claim as my invention and desire to secure by Letters Patent—

1. The combination, in a truck for moving railroad-axles, &c., of a supporting-axle and wheels, a tongue and suspending-arm at right angles to said supporting-axle, a pair of claws or nippers suspended from said arm and pivoted together below their point of suspension, a lever pivoted to the tongue and connected by links with said claws, and a recessed foot or swinging hook depending from the tongue, the combination being and operating substantially as and for the purpose set forth.

2. The combination of the tongue, the recessed foot or swinging hook depending therefrom, the suspending-arm, claws or nippers hung upon said arm and connected by a pivot-pin below their point of suspension, each claw having a projection at right angles to its pivot, and links connecting said claws with a lever pivoted to the tongue, so as to open and close the claws, substantially as set forth.

3. The combination of the tongue and suspending-arm, the pivoted claws and their operating lever and links, and a swinging hook or recessed foot depending from the tongue, substantially as set forth.

NICHOLAS THOMAS.

Witnesses:
THOMAS EADIE,
FREDERICK L. PHILLIPS.